United States Patent [19]

Streets et al.

[11] Patent Number: 4,640,730
[45] Date of Patent: Feb. 3, 1987

[54] METHOD OF ADHERING ROOFING MATERIALS

[75] Inventors: Roger L. Streets; Thomas G. Rabito; David N. Peresie, all of Ashland, Ohio

[73] Assignee: Ashland Oil, Inc., Russell, Ky.

[21] Appl. No.: 715,138

[22] Filed: Mar. 22, 1985

[51] Int. Cl.$^4$ ............................................. C09J 5/02
[52] U.S. Cl. .................................... 156/334; 156/157; 524/505; 525/98
[58] Field of Search ................ 156/157, 334; 524/505; 525/98

[56] References Cited

U.S. PATENT DOCUMENTS

| | | | |
|---|---|---|---|
| 3,427,269 | 2/1969 | Davis et al. | 156/334 |
| 3,658,740 | 4/1972 | Marrs et al. | 524/505 |
| 4,101,484 | 7/1978 | Doss | 156/334 |
| 4,404,056 | 9/1983 | Kakehi et al. | 156/334 |
| 4,501,842 | 2/1985 | Chmiel et al. | 524/505 |

Primary Examiner—John J. Gallagher
Attorney, Agent, or Firm—Mary E. Picken

[57] ABSTRACT

This process of adhering sheet roofing materials uses a SBS block copolymer mixed with hydrocarbon resin. No primer is needed, both dry bonding with heat and wet bonding processes have good green strength.

7 Claims, No Drawings

METHOD OF ADHERING ROOFING MATERIALS

Roofing materials useful for covering large roof areas are customarily prepared in wide sheets for efficient installation. These wide sheets must be overlapped and spliced together when the roofing sheets are installed to provide uniform surfaces. Overlap splicing is done under extreme weather conditions and the adhered sections must continue to withstand severe weather at extremes of cold and hot temperatures.

Customarily roofing materials, made from plastic, rubber or ethylene propylene diene (EPDM), have been spliced together on site with neoprene based adhesives. It has usually been necessary to use a primer on the roofing materials before applying the neoprene adhesives in order to obtain strong adhesive bonds.

Problems have been encountered with use of the neoprene adhesives in both poor green strength and inadequate long term durability. When primers are required the installation is more complicated and requires more time than does the one-step application of an adhesive which does not require a primer.

OBJECT OF THE INVENTION

It is accordingly the object of this invention to provide a durable strong roofing adhesive having good green strength without requiring use of a primer. A further object of this invention is to provide a roofing adhesive having strength at extreme temperatures.

SUMMARY OF THE INVENTION

In accordance with the present invention an adhesive composition is provided which needs no primer before application to roofing materials, and has both good green strength and long term durability. This invention is a process of adhering roofing materials comprising the steps of coating edges of said roofing material with an adhesive composition consisting essentially of an admixture of 100 parts by weight of a block copolymer, from 10 to 150 parts by weight of a hydrocarbon resin, and a solvent, allowing said coated edges to dry and joining said dried coated edges.

DESCRIPTION OF THE PREFERRED EMBODIMENT

In the preferred embodiment, after joining the dried coated edges, the further step of heating the joined edges at a temperature greater than 300° F. and less than 500° F. is performed.

Both radial block copolymer rubber and linear block copolymer rubber components are useful in the process of this invention. Preferred is the thermoplastic styrene - butadiene - styrene block copolymer. The product sold under the trademark KRATON 1101 by Shell Oil Company, Houston, Tex. is particularly useful. This is a thermoplastic rubber crumb product having a styrene: rubber ratio of 30:70. Kraton SBS block copolymers are described in U.S. Pat. No. 4,041,103 assigned to Shell Oil Company.

The hydrocarbon resin component useful in the process of this invention provides needed wetting properties so that the roofing adhesive will contact the EPDM roofing effectively. This hydrocarbon resin component of the adhesive must be physically compatible with the resin components of the roofing membrane. The hydrocarbon resins useful in the process of this invention act as strength modifiers of the block copolymer component since the hydrocarbon resins reinforce the styrene blocks of the thermoplastic styrene - butadiene - styrene block copolymer component. Among the hydrocarbon resins useful in the process of this invention are hydrogenated alicyclic hydrocarbons, linear homopolymers of alpha methyl styrene and copolymers of styrene or alpha methyl styrene with monomers such as vinyl toluene, acrylic monomers and butadiene. Suitable hydrocarbon resins include Amoco resin 18 polyalpha methyl styrene (Amoco, New York, N.Y.), Picco resin 6070 polymerized C7 to C9 aromatic monomer (Hercules, Wilmington, Del.) and Nevchem 140 aromatic hydrocarbon resin (Neville Chemical, Pittsburgh, Pa.).

The preferred solvent used to prepare the roofing adhesive is toluene. When 100 parts by weight block copolymer are combined with from 25 to 75 parts by weight hydrocarbon resin, toluene in the amount of from 200 to 500 parts by weight is used. Minor amounts of sulfur, hindered phenolic oxidants such as Wingstay L anti-oxidant (Goodyear, Akron, Ohio), phosphite anti-oxidant (Weston 618) distearyl pentaerythritol diphosphite (Borg-Warner Chemicals, Inc., Parkersburg, W. Va.) and zinc oxide are added to the adhesive. Further modifications may be made by the addition of processing oils, plasticizers, tackifiers, antiozonants, accelerators, and curatives dispersed in aromatic, aliphatic, ketone or chlorinated solvents.

In addition to the bonding of EPDM roofing sheeting membrane the process of this invention is useful on other roof sheeting such as neoprene, Hypalon rubber (DuPont, Wilmington, Del.), PIB polyisobutylene (Geotac RPM, Medina, Ohio) and polyvinyl chloride sheeting.

The process of this invention can be accomplished either at the end of the roofing manufacturing operation or at the job site.

At the end of the roofing manufacturing operation the thermoplastic, heat bonding roofing adhesive (formulated without either zinc oxide or sulfur) is applied to the edges of the roofing from a solvent solution either as a hot melt or as a dry film. The precoated rolls of roofing are shipped to the building site, unrolled and joined using heat gun equipment operating between 300° F. and 500° F. The optimum temperature varies depending on line speed, thickness of substrates, etc. With some tests the optimum temperature range has been above 375° F. and below 400° F. Among available useful equipment is the Leister-Kombi electric hot air TRIAC hand welding tool. These bonds contain no curative, remaining at the same strengths as when first bonded over time.

When the process of this invention is accomplished entirely at the job site the adhesive is the curable, heat or contact bonding formulation containing zinc oxide and sulfur. After applying to the edges of the roof sheeting the adhesive is allowed to dry for from 15 to 120 minutes. After drying the edges are bonded by either contact or heat activation. This bonded splice, having curatives incorporated into the adhesive, continues to improve in physical properties upon aging.

The following example sets forth the preparation of the roofing adhesive useful in this invention.

EXAMPLE ONE

Blends of polystyrene/polybutadiene/polystyrene block copolymer with hydrocarbon resins were prepared by adding 100 parts Kraton 1101 Thermoplastic Rubber Crumb SBS block copolymer (Shell Oil Company, Houston, Tex.), to 369 parts toluene in a laboratory mixer. Nevchem 140 Aromatic hydrocarbon resin (Neville Chemical, Pittsburgh, Pa.) in the amount of 50 parts, spider sulfur (C. P. Hall Company, Chicago, Ill.) in the amount of 2 parts, zinc oxide in the amount of 5 parts, Wingstay L antioxidant (Goodyear Tire and Rubber Company, Akron, Ohio) in the amount of 0.5 parts and distearyl pentaerythritol diphosphite in the amount of 0.5 parts were added. Mixing was continued for three to five hours until the adhesive was smooth. The adhesive was filtered and stored in drums.

The roofing material used was ethylene propylene diene (EPDM) sheet roofing stock sold by Goodyear, Akron, Ohio under the trademark VERSIGUARD. The roofing splice adhesive prepared as described above was applied to both Versiguard roofing stock edges using a brush. After air drying for 30 minutes the edges were joined while the adhesives was still wet and tacky by using hand rollers and sufficient pressure to insure intimate contact of the adherents. The immediate to 24 hr. bond strengths ranged from 5 to 10 pounds per lineal inch. At 72 hours the bond strengths exceeded 15 pounds per lineal inch.

As an alternate bonding method the adhesive was brush or roller applied to Versiguard sheet roofing stock, allowed to totally dry, then joined using the Leister hot air heat gun operating at a temperature range of from 300° F. to 500° F. The immediate bond strengths exceeded 15 pounds per lineal inch.

The following Example provides data about variation of the block copolymer component as to the styrene to rubber ratio and as to the styrene to rubber type. Both styrene-butadiene - styrene and styrene-ethylene/-butadiene - styrene were evaluated.

EXAMPLE TWO

Following the procedure of Example One Nevchem 140 aromatic hydrocarbon resin in the amount of 50 parts was added to 314.5 parts toluene. Kraton block copolymers having the indicated styrene/rubber ratios and types in the amount of 100 parts were added. Table 1 reports peel and shear data in which the S-B-S type block copolymer gives superior 24 hour peel strengths to the adhesive. The styrene-ethylene/butadiene - styrene block copolymer provided lesser 24 hour peel strengths to the roofing adhesive. Peel strengths are reported in pounds per linear inch.

TABLE 1

| Copolymer | Type | Styrene/Rubber | Peel Strength 24 hour | Peel Strength 168 hour | Shear Strength 24 hour | Shear Strength 168 hour |
|---|---|---|---|---|---|---|
| Kraton 1101 | S-B-S | 30:70 | 20.5 | 17.0 | 32.8 | 67.5 |
| Kraton 1184 | S-B-S | 30:70 | 16.5 | 15.3 | 21.7 | 61.0 |
| Kraton 1651 | S-E/B-S | 33:67 | 7.3 | 11.6 | 22.7 | 68.5 |
| Kraton 1652 | S-E/B-S | 29:71 | 5.3 | 14.1 | 20.6 | 60.0 |
| Kraton 1657 | S-E/B-S | 14:86 | 1.7 | 19.8 | 16.3 | 57.0 |

The following Example provides data about variation in the level of hydrocarbon resin. This resin reinforces the styrene endblock of the Kraton S-B-S copolymer.

EXAMPLE THREE

Following the procedure of Example One Nevchem 140 aromatic hydrocarbon resin in amounts from 10 to 150 parts as provided in Table 2 below were added to 100 parts Kraton D1101 S-B-S copolymer in varying amounts of toluene also as provided in Table 2 below.

TABLE 2

| Copolymer Kraton 1101 | Hydrocarbon Resin Nevchem 140 | Solvent Toluene | Strength: 24 Hour lbs/in Peel | Strength: 24 Hour lbs/in² Shear |
|---|---|---|---|---|
| 100 parts | 50 parts | 314.5 parts | 12.27 | 38.0 |
| " | 75 parts | 364.5 parts | 9.80 | 47.0 |
| " | 100 parts | 414.6 parts | 8.17 | 38.0 |
| " | 125 parts | 464.7 parts | 7.73 | 32.4 |
| " | 150 parts | 514.8 parts | 9.30 | 36.0 |
| " | 30 parts | 274.4 parts | 11.40 | 52.3 |
| " | 10 parts | 234.4 parts | 8.40 | 55.8 |
| " | 0 parts | 214.3 parts | no bond | no bond |

The following Example provides data about variation of a component which reinforces the rubber midblock of the copolymer.

EXAMPLE FOUR

Following the procedure of Example One Kraton D1101 copolymer in the amount of 100 parts and Nevchem 140 hydrocarbon resin in the amount of 85 parts were added to varying amounts of toluene and Escorez 5380 Synthetic Hydrocarbon resin (Exxon, Houston, Tex.), as provided in Table Three.

TABLE 3

| Escorez 5380 | Toluene | Strength 24 Hours Peel lbs/in | Strength 24 Hours Shear lbs/in² |
|---|---|---|---|
| 25 parts | 435 parts | 6.43 | 3.67 |
| 75 parts | 535 parts | 3.93 | 1.98 |
| 0 parts | 385 parts | 12.23 | 3.78 |
| 100 parts | 585 parts | 2.87 | 1.98 |

The following Example provides data about the effect of varying the hydrocarbon resins in the process of this invention.

EXAMPLE FIVE

Following the procedure of Example One to 100 parts Kraton 1101 copolymer and 368.7 parts toluene were added to 50 parts of the hydrocarbon resin indicated in Table 4. The Nevchem hydrocarbon resins were obtained from Neville Chemical, Pittsburgh, Pa. The Picco hydrocarbon resin and the Dymerex rosin ester resins were obtained from Hercules, Wilmington, Del. The other resins were: Amoco 18-290 alpha methyl styrene, Amoco Chemicals Corp., Chicago, Ill., Union Carbide CKR 1634 t-butyl phenolic resin, Union Carbide Corp., New York, N.Y., Reichhold ZINAR zinc resinate resin, Reichhold Chemicals, Inc., Pensacola, Fl., and Schnectady CRG 418 octyl phenolic resin, Schnectady Chemicals, Inc., Schnectady, N.Y. After bonding (using the hot air hand welding tool) peel and shear strengths were measured. The ability of the adhesive bonds to withstand elevated temperatures was tested by measuring peel strengths at 150° F., 175° F. and 200° F. The control samples were the presently commercially available EPDM roofing adhesives requiring an isocyanate blend primer followed by Goodyear G100 SA-1 neoprene seam adhesive.

TABLE 4

| Endblock Resin Type | Room Temperature Strength Peel 24 Hr. Shear | | Elevated Temperature Peel Strength | | |
|---|---|---|---|---|---|
| | lb/in | lb/in² | 150° F. | 175° F. | 200° F. |
| 1235-24 Nevchem 140 Hydrocarbon | 12.3 | 38.0 | 2.7 | 0.7 | 0.1 |
| 1235-25 Nevchem LX1035 Hydrocarbon | 10.0 | 50.5 | 1.0 | 0.2 | 0 |
| 1235-26 Nevchem LX509 Hydrocarbon | 5.6 | 47.0 | 2.60 | 2.2 | 0.5 |
| 1235-27 PICCO 6140 Hydrocarbon | 11.8 | 48.0 | 1.20 | 0.2 | 0 |
| 1235-29 Amoco 18-290 alpha methyl styrene | 10.3 | 64.5 | 1.70 | 0.90 | 0.6 |
| 1235-30 Union Carbide CKR 1634 | .3 | 17.4 | — | — | — |
| 1235-31 Reichhold Zinar zinc resinate | .4 | 8.6 | — | — | — |
| 1235-32 Schnectady CRG418 octyl phenolic | 6.6 | 48.7 | 0.7 | 0.2 | 0 |
| 1235-33 Dymerex rosin ester | 0.1 | 5.1 | — | — | — |
| Commercial Control Primer + Neoprene Adhesive | 8 to 12 | 40 to 60 | 4.8 | 2.3 | 1.8 |

The following Example provides data about use of the styrene-isoprene-styrene copolymer component in the roofing adhesive useful in the process of this invention. Various resins were tested for their tackification of the Kraton midblock.

EXAMPLE 6

Following the procedure of Example 1, to 100 parts Kraton 1107 styrene-isoprene-styrene block copolymer, 50 parts Nevchem 140 aromatic hydrocarbon resin, 2 parts sulfur, 5 parts zinc oxide and 427 parts toluene were added 25 parts of the resins indicated in Table 5. After application to the EPDM roofing material edges bonding was accomplished using the contact method. Peel strengths were measured after 3 days and 7 days after aging at room temperatures (RT) and 158° F. The results are provided in Table 5 as condition aging/condition of testing. The best overall peel strength and heat resistance performance was observed with the rosin ester resin and the synthetic polyterpene resin. However, the isoprene midblock can be tackified by a variety of resins.

TABLE 5

| Resin | Peel Strength 3 days | | 7 days | | |
|---|---|---|---|---|---|
| | RT/RT | 158° F./RT | RT/RT | 158° F./RT | 158° F./200° F. |
| 1235-61 Hercules rosin ester Stabelite Ester 10 | 5.4 | 19.6 | 8.13 | 18.47 | 4.27 |
| 1235-62 Hercules Pentalyn H rosin ester | 5.5 | 19.1 | 6.93 | 12.0 | 1.50 |
| 1235-65 Reichhold Piccofyn A 135 terpene phenolic | 4.3 | 17.0 | 5.27 | 10.17 | 2.97 |
| 1235-68 Reichhold Super Sta-Tac synthetic polyterpene | 5.7 | 14.5 | 8.13 | 8.20 | 1.97 |
| 1235-69 Reichhold Super Sta-Tac 100 Synthetic polyterpene | 6.0 | 17.9 | 8.70 | 12.40 | 1.40 |
| 1235-72 Neville Nevtac 100 Synthetic polyterpene | 6.0 | 21.3 | 8.73 | 18.33 | 2.67 |
| 1235-75 Hercules Piccovar AP25 petroleum hydrocarbon | 5.8 | 17.5 | 8.60 | 10.03 | 1.77 |
| 1235-10 Ashland Pliobond 5386 Adhesive | 15.7 | 15.5 | 20.33 | 18.07 | 1.2 to 1.6 |

We claim:

1. A process of adhering roofing materials consisting essentially of the steps of (a) coating edges of EPDM roofing materials with an adhesive composition consisting essentially of an admixture of 100 parts by weight of a thermoplastic block copolymer, from 10 to 150 parts by weight of an aromatic hydrocarbon resin, and solvent, (b) allowing said coated edges to dry, (c) joining said dried coated edges, and (d) heating said joined edges to a temperature greater than 300° F. and less than 500° F.

2. The process as recited in claim 1 wherein said block copolymer is a thermoplastic styrenebutadiene-styrene block copolymer.

3. The process as recited in claim 1 wherein said adhesive composition consists essentially of an admixture of 100 parts by weight of block copolymer, from 25 to 75 parts by weight hydrocarbon resin and solvent.

4. The process as recited in claim 1 wherein said aromatic hydrocarbon resin is polyalpha methyl styrene.

5. The process as recited in claim 1 wherein said solvent is toluene.

6. The process as recited in claim 1 wherein said block copolymer is a thermoplastic styrene-isoprenestyrene block copolymer.

7. The process as recited in claim 6 wherein said adhesive composition further comprises 2 parts sulfur and 5 parts zinc oxide.

* * * * *